United States Patent [19]

Häfner

[11] Patent Number: 4,528,848
[45] Date of Patent: Jul. 16, 1985

[54] DEVICE FOR THE CONTINUOUS GRAVIMETRIC METERING AND PNEUMATIC CONVEYANCE OF POURABLE MATERIAL

[75] Inventor: Hans Häfner, Aichach, Fed. Rep. of Germany

[73] Assignee: Pfister GmbH, Fed. Rep. of Germany

[21] Appl. No.: 492,135

[22] Filed: May 6, 1983

[30] Foreign Application Priority Data

May 8, 1982 [DE] Fed. Rep. of Germany ....... 3217406

[51] Int. Cl.³ .................... G01F 1/115; G01G 11/04; G01G 11/16
[52] U.S. Cl. .................... 73/218; 73/432 R; 73/198; 110/101 CC; 222/77; 222/370; 222/636; 222/55; 177/84; 177/16; 177/103; 177/59
[58] Field of Search ............. 73/201, 198, 217, 432 G, 73/432 R, 218, 861; 177/59, 64, 65, 83, 84, 90, 103, 117, 245, 16, 145; 222/370, 636, 630, 77, 55; 110/101 CC

[56] References Cited

U.S. PATENT DOCUMENTS

| | | | |
|---|---|---|---|
| 720,008 | 2/1903 | Doble | 177/84 |
| 2,314,031 | 3/1943 | Colburn | 222/370 X |
| 3,076,580 | 2/1963 | Heath | 222/370 X |
| 3,112,000 | 11/1963 | Morris et al. | 177/84 X |
| 3,195,776 | 7/1965 | Helm et al. | 222/370 X |
| 3,477,529 | 11/1969 | Burn et al. | 177/59 X |
| 3,561,643 | 2/1971 | Kloven | 222/55 |
| 4,092,046 | 5/1978 | Bombelli et al. | 222/370 X |
| 4,336,851 | 6/1982 | Iwako | 222/77 X |
| 4,389,949 | 6/1983 | Heep | 110/101 CC X |
| 4,391,140 | 7/1983 | Reinhard et al. | 73/432 R |
| 4,430,963 | 2/1984 | Finet | 110/101 CC X |

FOREIGN PATENT DOCUMENTS

| | | | |
|---|---|---|---|
| 558146 | 6/1958 | Canada | 222/370 |
| 49062 | 4/1982 | European Pat. Off. | 110/101 CC |
| 3036018 | 3/1981 | Fed. Rep. of Germany | 222/370 |
| 2356913 | 1/1978 | France | 222/77 |
| 2056697 | 3/1981 | United Kingdom | 73/218 |
| 223400 | 11/1968 | U.S.S.R. | 222/370 |

Primary Examiner—Stewart J. Levy
Assistant Examiner—Tom Noland
Attorney, Agent, or Firm—Hill, Van Santen, Steadman & Simpson

[57] ABSTRACT

A device for continuous, gravimetric metering and pneumatic conveying of pourable material provides that a material stream is conveyed over a measuring path while charging a load measuring device and the product of moment load and conveying speed is formed. The conveyor is in the form of a rotor having an essentially vertical axis and conveyor pockets in the form of chambers or cells which are moved with the rotor in a circular orbit over the measuring path. A housing surrounds the rotor in a pressure tight manner and includes a charging aperture and an emptying aperture which are rotationally displaced from one another. A load measuring device is connected to the housing and a tachometer is provided for measuring the angular velocity of the rotor. A pneumatic conveying system is provided which has feed lines respectively communicating with an air feed aperture in the housing and the emptying aperture.

23 Claims, 7 Drawing Figures

DEVICE FOR THE CONTINUOUS GRAVIMETRIC METERING AND PNEUMATIC CONVEYANCE OF POURABLE MATERIAL

BACKGROUND OF THE INVENTION

1. Field of the Invention

The present invention relates to a device of a continuous, gravimetric metering and pneumatic conveyance of portable material wherein a material stream is conveyed by a conveying device over a measuring path while charging a load measuring device and the product of momentary load and conveying speed is identified.

2. Description of the Prior Art

Devices for continuous, gravimetric metering of pourable material are known in the art, for example, as metering conveyor type weighers. These are essentially employed for the formation of a constant-weight material stream in systems for the formation of mechanical mixtures or, respectively, for the gravimetric identification of a conveying capacity in, for example, loading or unloading a container of a vehicle.

A conveyor-type weigher can be employed either velocity-controlled or weight-controlled in order to produce a constant-weight material stream, for example, the formation of a constant mechanical mixture from a plurality of components. In this context, see Betriebshütte, 6th Edition, Vol. III, pp. 237–246.

Other devices, in addition to metering conveyor-type weighers, are known for the continuous, gravimetric metering of portable material, for example, belt conveyors, as well as continuously integrating bucket conveyor scales. A weight-controlled metering screw is likewise known in the art. The use of the metering screw is preferably reserved for the gravimetric conveying and/or metering of powdery material.

Metering conveyor-type weighers, due to the open structure of the conveying device, are only conditionally suitable for use with powdery, nearly free-flowing material. The formation of dust during delivery and/or discharge cannot be avoided even with careful boxing. Moreover, a metering conveyor-type weigher cannot be directly integrated in a pneumatic conveying device for powdery material. Similar disadvantages also apply to other known metering conveyor systems such as, for example, belt conveyors and/or metering screws. As a consequence, these known gravimetric metering devices are not suitable for charging with, for example, combustible, toxic, powdery substances subject to oxidation serving for the production of foodstuffs which are sensitive for material reasons.

Devices for continuous, gravimetric metering of fine-grain material which can also be directly and without problems inserted in a pneumatic conveying system at the same time are unknown in the art.

SUMMARY OF THE INVENTION

The object of the present invention is to provide a device for continuous, gravimetric metering of pourable material, which device is particularly suited for use with powdery substances tending towards dust formation which are dangerous or sensitive and have nearly free-flowing behavior, and which can be directly integrated as a closed system in a pneumatic conveying device. The device should be pressure-tight and dust-tight and be capable of use as a controllably-adding or integrating dynamic scale and/or metering device.

The above object is achieved, according to the present invention, in the provision of a device wherein a material stream is conveyed with a conveyor device over a measuring path while charging a load measuring device in that the conveyor device is designed in the form of a rotor having an essentially vertical axis, having conveyor pockets in the form of chambers or cells which are moved with the rotor in a circular orbit through the maasuring path, and also having a housing surrounding the rotor in a pressure type manner and having a drive for the rotor and a respective charging and emptying aperture at the housing, as well as with a load measuring device connected to the housing and a device for measuring the angular velocity of the rotor, and connections to the lines of a pneumatic conveyor system.

As a consequence of its closed, pressure-tight structure, the device constructed in accordance with the present invention is advantageously suited for the continuous, gravimetric metering of powdery substances tending toward dust formation which, in particular, are dangerous or sensitive and which have a nearly free-flowing behavior. It can be advantageously directly integrated into a pneumatic conveying device without problems.

For the purpose of controllability based on speed, a feature of the invention provides that the drive preferably is infinitely variable and equipped with a tachometer generator.

According to a further feature of the invention, it is provided that a static conveying system, essentially operating path-free, such as a wire strain gauge, is employed as the load measuring device.

In that a weighting system contructed in accordance with the invention operates in a nearly path-free manner, the positional changes of the conveyor device under load and, therewith, falsifications of the measured value, are advantageously avoided.

The utility of the device, given very fine-grained dust tending toward dust formation, is promoted in that, in accordance with a further feature, the upper side and the underside of the rotor are preferably designed as planar surfaces which fit snugly against the walls of the housing. A good seal between the housing and the rotor is thereby advantageously achieved. The seal is also further improved in that the walls of the rotor, which are movable relative to one another, press against the rotor with a pre-stress condition, by means of a spring arrangement. Therefore, the seal is always constantly functionally maintained under operating conditions as, in particular, are given in a pneumatic conveyor system.

An identification of the momentary load which is influenced by external forces and also by pressure forces of the pneumatic conveying system and, therefore, which is error-free, is advantageously achieved in that both the charging and the emptying apertures of the housing are disposed adjacent one another at the housing, as viewed in a vertical projection on a horizontal plane, and are connected to a respective, stationary charging and/or emptying device or, respectively, to pneumatic lines by way of flexible and/or elastic connections, such as line joints or compensators.

It is further provided that one side of the housing is disposed pivotable around an axis which extends through the elastic connections and, preferably, through the center of pivot, in contrast whereto, the opposite side of the housing is hinged to the load measuring device.

The housing can thereby be advantageously supported in spring universal joints, whereby a friction-free joint operation is achieved.

The problem-free, direct integration of the device in a pneumatic conveying system is advantageously achieved in that the emptying aperture of the housing is connected to a pneumatic conveyor line by way of an elastic and/or resilient, pressure-loadable connection and in that, at the housing opposite the emptying aperture, a pipe union for the introduction of conveying gas is provided and is connected to a stationary conveying gas line with a preferably elastic, pressure-loadable connection, whereby the elastic connection is also disposed in the area of the axis.

In accordance with a further advantageous feature of the invention, an arrangement of sealing elements, preferably semi-elastic or elastic seals, can be provided between the rotor and the housing, particularly between the conveyor pockets and the housing. Materials which may be used, for example, as semi-elastic seals, are seals of tetrafluorethylene or, respectively, polyurethane seals having approximately 90° Shore hardness. Softer synthetic materials, such as rubber, natural caoutchouc, vinyl caoutchouc or felt gaskets may also be used as elastic seals.

It is further provided that the device, particularly for use in dust which are subject to explosion, is equipped in an explosion-proof manner with a shock pressure-proof, double-wall housing, whose outer walls are rigidly connected to the inner walls and are executed in the shape of a bomb, these forming cavities, together with the inner walls, which are filled with a non-compressible liquid, preferably water.

An advantageous solution for a pressure-proof structure, which meets the highest requirements, is obtained, given relatively low weight, with the proposal of a double-wall housing whose wall interstices are filled with water.

The explosion-proof construction of a device, in accordance with the present invention, is particularly advantageous for meeting statutory safety regulations, given the use of the device for the gravimetric metering of superfine, particularly combustible dust, which dust is subject to explosions, such as, for example, coal dust.

Since, in contrast to known devices for the continuous, gravimetric metering of pourable material, a hermetically closed, pressure-tight gravimetric metering system suitable for direct introduction into a pneumatic conveying system is provided in accordance with the present invention, it is suitable not only from metering materials with an explosion hazard but, rather, is also suitable for toxic or sensitive dust, as well as substances which are subject to oxidation hazard or sensitive and/or valuable substances which are employed in the foodstuffs industry or, respectively, in the chemical industry. Included, for example, are medication substances, cacao powder, flour, powdered milk and similar substances.

Finally, an advantageous development of the invention provides that the drive of the rotor is disposed at the underside of the housing.

Surveyable and favorable space relationships are thereby advantageously created, these considerably facilitating the disposition of, in particular, the connection elements for the material delivery and the discharge line, the joints as well as the connections to a pneumatic conveying system, as well as to the load measuring device.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figures 1, 2:
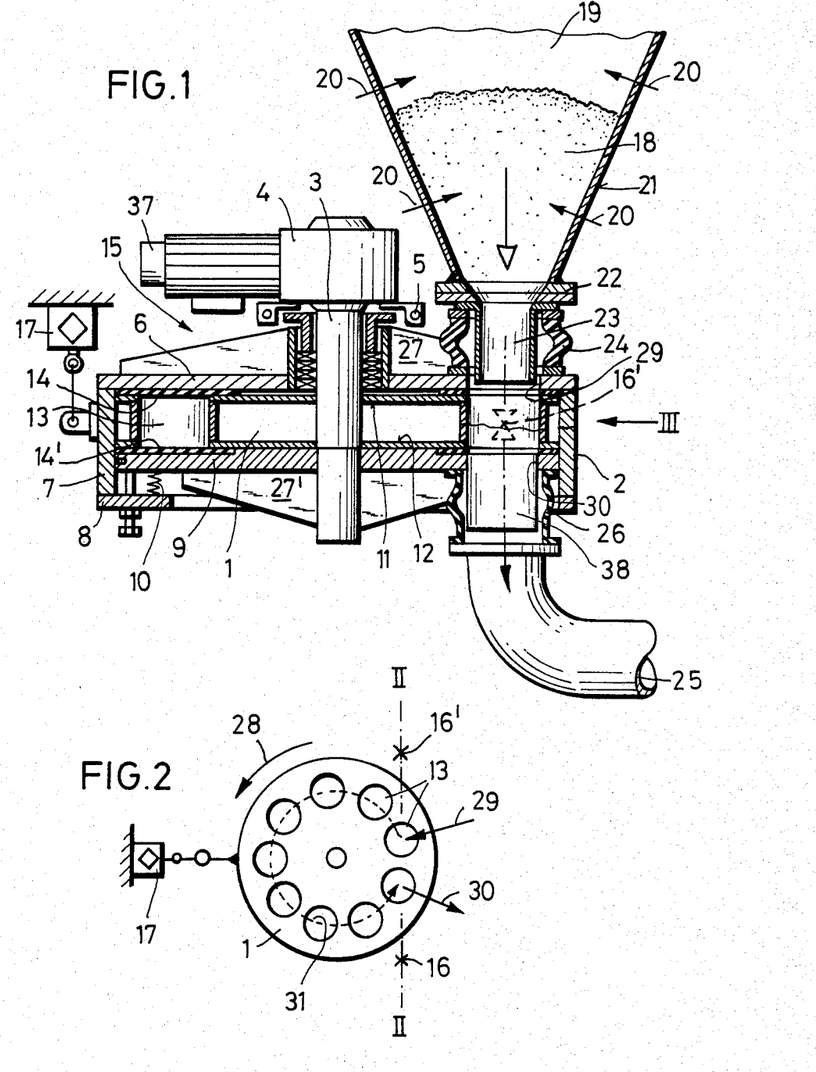
FIG. 1 is a partial sectional view of a device constructed in accordance with the present invention.
FIG. 2 is a functional diagram of the device of FIG. 1.

Referring to FIG. 1, a device 15 is illustrated for gravimetric metering of powdery material and encompasses a conveyor device including a rotor 1 and a housing 2 which tightly surrounds the rotor 1. The rotor 1 is rotatably and drivably seated on a shaft 3. A motor/gear unit 4 is connected to the housing 2 by way of torque supports 5 and is provided as the drive arrangement. The device 15 comprises an upper housing cover 6, a cylindrical housing section 7 and an inwardly-projecting flange 8 secured thereto, and also a lower housing cover 9. Within the cylindrical housing section 7, the lower housing cover 9 is movably disposed in the axial direction and is elastically pressed against the rotor 1 in the direction towards the upper housing cover 6 by way of a spring arrangement 10 which is supported on the flange 8. By so doing, it is achieved that the inner walls of the upper cover 6 and of the lower cover 9 press against the rotor 1 with an elastic pre-stressing. The rotor comprises two discs 11 and 12 rigidly connected to the shaft 3 and having conveyor pockets 13 therebetween. According to FIG. 4, the conveyor pockets 13 can be designed either as cylindrical containers 13' or as cell-like boxes 13''. Seals 14, 14', which are preferably annular, are received in the upper housing cover 6 and the lower housing cover 9, respectively, these forming a tight seal relative to the conveyor pockets 13 or, respectively, 13', 13''. The sealing effect is significantly promoted by way of the action of the spring arrangement 10 due to the elastic contact pressure exerted by the lower housing cover 9. As can be seen at the right-hand side of the illustration in FIG. 1, the housing 2 is pivotally suspended in a spring universal joint 16 and is held at the left side of the housing by a load measuring device 17.

The material 18 to be gravimetrically metered is stored in a container 19 disposed above the housing 15. Should this material be a matter of very fine-grain material, for example coal dust, which may potentially tend towards lumping or, respectively, to bridging, then a disaggregation device of a known type, as symbolically indicated by the arrows 20, may be provided, such as air shock devices, motion rods, agitators, shakers or the like. At its tip 21, the stationarily disposed container 19 comprises a flange 22 having a discharge funnel 23. A charging aperture 29 is disposed in the housing 2 at the opposite side in the area of the orbit of the conveyor pockets 13 of the rotor 1. An elastic compensator 24 is provided for the hermetically-tight connection between the upper housing cover 6 having the charging aperture 29 and the flange 22 of the container 19. An elastic compensator 26 is correspondingly provided in a similar manner or, respectively, identical disposition between the discharge opening 30 of the lower housing cover 9 and a stationary discharge line 25. In order to reinforce the housing 2, ribs 27 are provided at the upper side of the housing cover 6, as ribs 27' are likewise provided at the underside of the housing cover 9.

A functional diagram of the metering device can be seen in FIG. 2. Given a rotational movement of the rotor 1 within the stationary housing 2 (not illustrated) in the direction of the arrow 28, the conveyor pockets 13 are filled with powdery material at the delivery aperture indicated by the arrow 29 given continued motion between the discharge funnel 23 illustrated in FIG. 1. The fill conveyor pockets then move from the charging aperture 29 to the emptying aperture 30, rotationally displaced therefrom, on a circular path, moving over the measuring path indicated by the broken line 31. The weight of the material in the conveyor pockets 13 thereby generates a load moment around a pivot axis II—II formed by the universal joints 16, 16'. The load of all conveyor pockets 13 situated in the measuring path 31 which is thereby effective is detected by the load measuring device 17 as a moment load. The gravimetrically meterable flow quantity which, given the device constructed in accordance with the present invention, is adjustable and speed-regulation and is computationally identified as the product of the velocity and the moment load.

Figure 3:
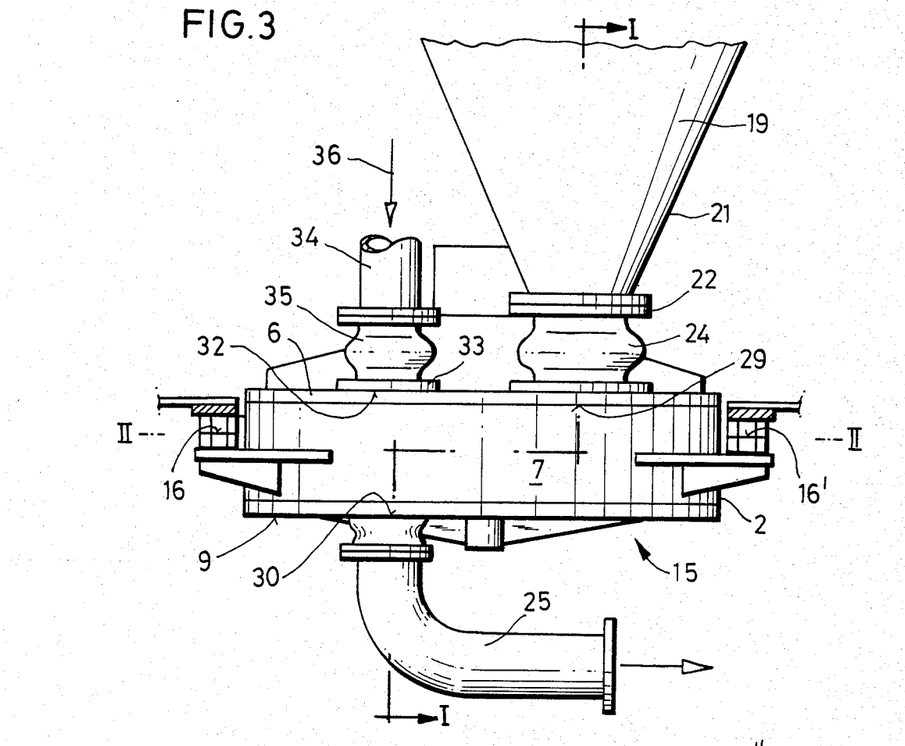
FIG. 3 is an elevation taken in the direction of the arrow III of FIG. 1.

The disposition of the individual operational elements seen from the direction of the arrow III in FIG. 1 is illustrated in FIG. 3. This view shows the container 19 with the tip 21 and flange 22 and, further, illustrates the elastic compensator 24. The device 15 is pivotally secured about the axis II—II which is determined by the pivot point of the universal joints 16, 16' and, as shown in FIG. 1, is supported by the load measuring device 17. The lateral spacing in the disposition of the charging aperture 29 and the emptying aperture 30 in the projection of the apertures onto a horizontal plane extending through the axis II—II can be seen from FIG. 3. The illustration further shows a connection 33 for a pneumatic line 34 at a location 32 of the housing cover 6 lying opposite the emptying location 30. A compensator 35 of elastic material produces a hermetically tight, ductile connection between the stationary line 34 and the housing connection 33. The pneumatic line 35 serves for the supply of compressed air, indicated by an arrow 36, and is a portion of a pneumatic conveyor system which encompasses the metering device 15 of the present invention, the container 19 and the conveyor line 25.

During operation of the metering device, the rotor 1 rotates at a prescribed speed under the influence of its drive. The drive, comprising the motor/gearing unit 4, is infinitely variable. For the purpose of reporting the speed, it comprises a tachometer generator 37 connected to the shaft of the motor. Given rotational movement of the rotor according to the arrow 28 of FIG. 2, a respective conveyor pocket 13 or, respectively, 13', 13", proceeds into the area of the charging aperture 29 and is filled with material 18, for example, coal dust, from the tip 21 of the container 19 during its continued motion below the discharge funnel 23. The filled conveyor pocket 13, together with other filled conveyor pockets 13, terminated at the top and bottom by the housing walls 6 and 9 or, respectively, the seals 14, 14', travels over the measuring path indicated in FIG. 2 as a broken line path 31, on a circular orbit of approximately 345°. The weight of the material fills in the migrating conveyor pockets 13 thereby generates a moment load at all times. This moment load acts on the load measuring device 17 over the housing 2 and is converted by the measuring device 17 into a weight-proportional electric signal. When moving over the measuring path 31, the conveyor pockets 13 finally arrive at the emptying aperture 30 and empty through the emptying nozzle 38 into the discharge line 25. Given a compressed air arrangement according to FIG. 3, having the line 34, the elastic compensator 35 and the housing connection 33 with the entry aperture 32, the content of a conveyor pocket 13 is blown out by compressed air 36 into the discharge line 35 and is pneumatically conveyed therein by conveying air 36 to a consuming point (not illustrated).

Direct integration of a device for continuous, gravimetric metering of powdery bulk material in a pnematic conveying system is realized for the first time with this arrangement which is essential to the invention.

As likewise known from the case of other continuous, gravimetric metering devices, the conveyed material, after a reference/actual comparison, can be controlled with the device by way of a known control device. The values of moment load and velocity identified by way of electric signals are thereby multiplied in order to identify the conveying stream density and the result is compared to a reference value. In order to maintain the density of the conveying stream constant, the velocity of the rotor is controlled given an occurring reference/actual difference such that the product of velocity and moment load remains constant.

Figure 4:
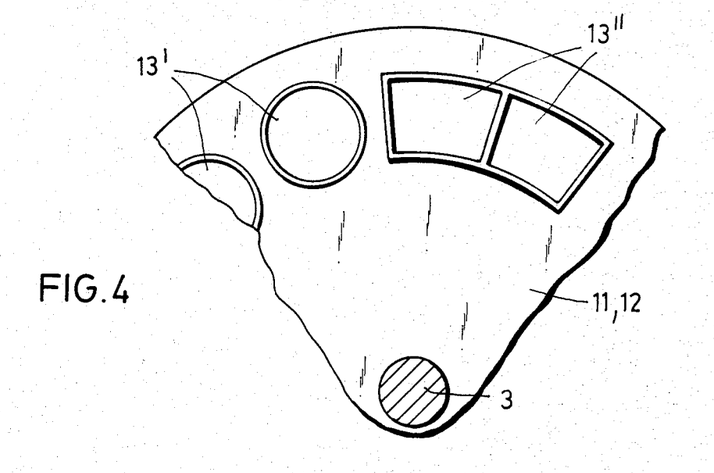
FIG. 4 is a partial plan view of the rotor, illustrating differently-designed conveyor pockets.

Exemplary embodiments of different designs of the conveyor pockets 13', 13" are illustrated in FIG. 4, as mentioned above. In the plan view of a portion of the rotor 1 or, respectively, the discs 11, 12 forming the body of the rotor 1, cylindrically-designed conveyor pockets are referenced 13' and cell-like or box-like conveyor pockets are referenced 13". The provision of the latter produces a very uniform, impact-free material throughput, whereas the cylindrical conveyor pockets 13' are very advantageous given the use of higher pressures and highest requirements made of the sealing conditions between the housing covers 6 and 9, for example, in the case of relatively high pneumatic conveying pressures.

Figure 5:
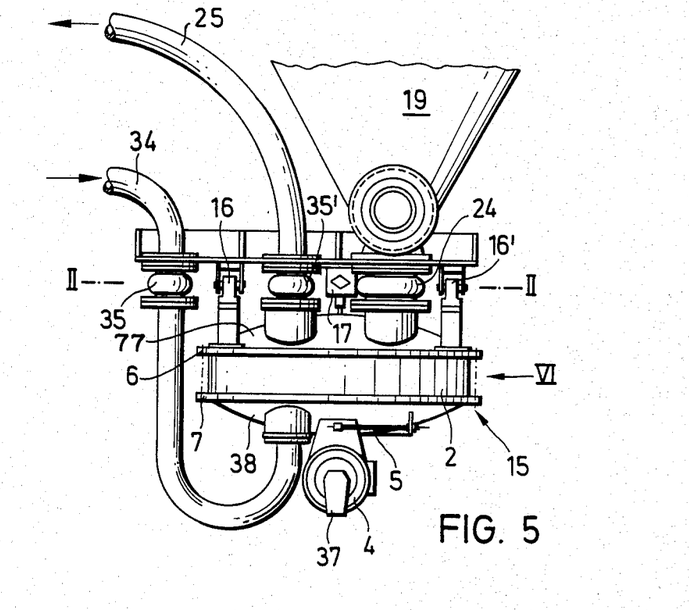
FIG. 5 is an elevation of an explosion-proof construction, shown in a view from a direction of view perpendicular to the pivot axis.
Figure 6:
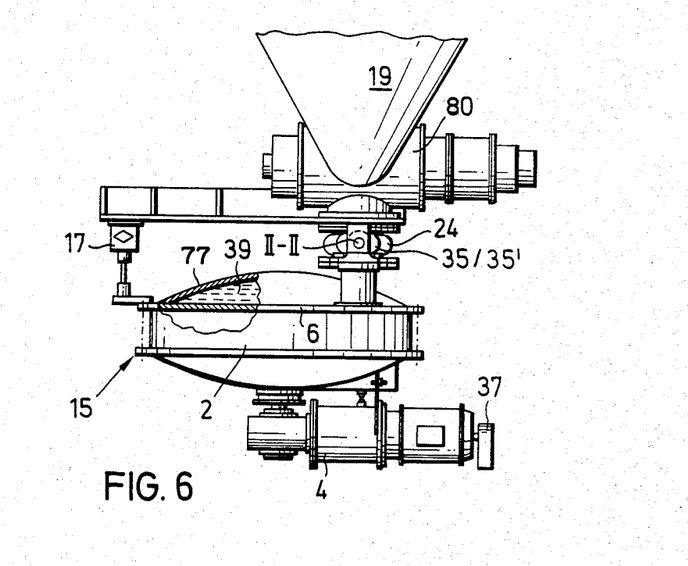
FIG. 6 is a side elevation of the device of FIG. 5 as viewed from the direction VI of FIG. 5.

An execution of the device 15 in an explosion-proof format can be seen in views from various directions in FIGS. 5 and 6. The special feature of this explosion-proof execution is the reinforcement of the upper and lower housing covers 6, 7 by bomb-shaped or spherically-shaped sections 77 and 38 welded thereto. As the partial fragmentary section illustrates at the left-hand housing side in FIG. 6 shows, the double floor 77 forms a cavity 39 with the upper housing cover 6, the cavity being filled with water. What is achieved by this design of the housing 2 is that the planar housing cover 6 is able to resist a load per surface unit of, for example, 10 bar and more without changing shape and given absolute tightness. This is achieved by way of the double floor execution and in that the outer reinforcing floor 37 exhibits a spherical or elliptical profile and in that a non-compressible fluid fills the cavity 39 for supporting the planar cover 6 relative to the double floor 37. FIG. 5 also illustrates the pivot axis II—II determined by the universal joints 16, 16' and the elastic, pressure-loadable compensators 24, 35 and 35' displaced into the area of the axis II—II. The linking of the housing 2 to the load measuring device 17 can also be seen from FIGS. 5 and 6. It should also be noted that the compressed air supply through the conduit 34 and the conveyance of the material through the conduit 25 are opposite to that illustrated in FIG. 3.

In the exemplary embodiment of the explosion-proof execution of the device 15, the charging container 19 is partitioned pressure-tight with a cellular wheel sluice 80, as seen in FIG. 6. As the illustration further shows, the disposition of the drive 4 with the tachometer generator 37 at the underside of the device 15 is particularly expedient because, as a result, sufficient space exists for a surveyable disposition of the required distributing members and, in particular, a problem-free disposition of the lines 25 and 34 of the pneumatic conveying system, as well as of the universal joint arrangement and linking of the load measuring device are provided. In this regard, the arrangement in FIG. 5 clearly shows the torque support 5 between the housing 2 and the drive 4. The illustration further shows the position of the pneumatic conveyor line 25 and of the line 34 for the conveying air, whereby the disposition of these two lines, departing from the execution illustrated in FIG. 3, is selected such that the emptying of the conveyor pockets is undertaken by way of compressed air from the bottom towards the top, i.e. overhead. Essential to the operation in all instances given this and similar arrangements is that all elastic, pressure-loadable connections between stationary lines and/or feeder or, respectively, discharge or conveying elements and the housing 2 are executed with flexible, pressure-loadable (under certain conditions) connections 24, 35, 35' and that these, in terms of their disposition, coincide with the course of the pivot axis II—II, as is clearly evident from FIGS. 5 and 6.

As a result of this type of disposition of flexible, pressure-loadable connections in the course of the pivot axis and, preferably, in such a manner that the pivot axis is placed approximately through the motional center of the flexible connection, a device constructed in accordance with the invention is suitable for the direct, controllable metering of a powdery substance in cooperation with a reservoir disposed above the device, without requiring the pre-connection of a volumetrically metering allocation device for the controllable setting for a prescribed, reference conveying power, as is absolutely necessary, for example, given gravimetric metering of powdery, free-flowing dusts having an open system such as a conveyor-type weigher. There, the conveyor-type weigher serves only for actual gravimetric determination of the conveyed flow quantity, whereas the control operation for a change thereof is forwarded to the volumetric distributing member preceding the conveyor-type weigher over a setting pulse for the control device, the distributing element increasing or reducing the conveying stream according to the measure of the control pulse, this, in turn, being merely monitored by the dynamic weighing device.

As stated above, the necessity of preceding the gravimetric metering device with a mechanical, volumetric distributing device controlled by a control device is avoided or, respectively, becomes superfluous as a result of the gravimetric metering device of the present invention.

Figure 7:
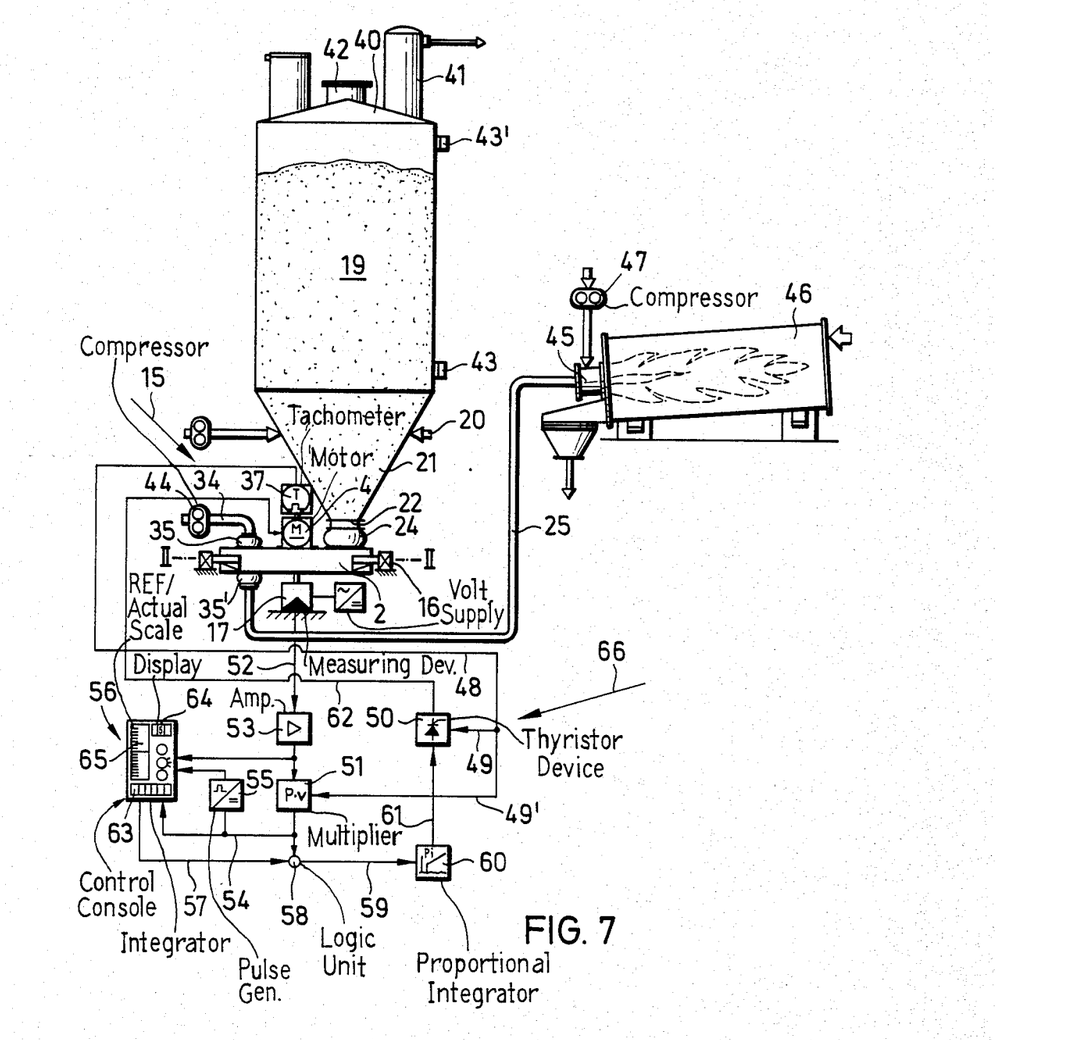
FIG. 7 is a representation of a device constructed in accordance with the present invention and integrated in a pneumatic conveying system of a coal dust burner, shown basically in block diagram form and basically in elevation.

An example of the direct employment of a device constructed in accordance with the present invention as a gravimetric metering device, given full controllability without pre-connection of a control, volumetric metering device, as well as the simultaneous employment of the gravimetric metering device as a part of a pneumatic conveying system is illustrated in FIG. 7. The closed container 19 contains a powdery material to be conveyed. In the area of its cover 40, it comprises a closed evacuation and aeration filter 41 and an inspection opening 42 having an explosion door as a closure.

A deagglomeration device 20 is disposed in the area of the discharge tip 21 of the container 19. The container 19 is further equipped, in a known manner, with filling level indicators 43, 43'. The gravimetric metering device 15 is directly and flexibly connected to the container flange 22 by way of the compensator 24. It is flexibly disposed with the joints 16, 16' in the pivot axis II—II in the manner described above and is supported with the load measuring device 17 in a power transmissive connection which causes the device 15 to press on the measuring device 17 in a manner opposite to that of FIG. 1 in which the device 15 pulls on the measuring device 17. The device 15 is further arranged as an integrating element of a pneumatic conveying device which comprises a compressor 44, the compressed air line 34, the compensators 35 and 35', and the pneumatic conveying line 25. A burner 45 in a kiln 46 is disposed at the end of the conveying line 25, the burner 45 being supplied with combustion air by way of a compressor 47 in order to develop a flame.

A motor M is located at the housing 2 of the device 15 and, assigned to the motor, is a tachometer generator T on the same shaft. A signal line 48 is connected from the tachometer generator T by way of a branch 49 to a thyristor device 50 and by way of a branch 49' to a multiplier 51. Connected to the signal output of the load measuring device 17 is a signal line 52 which, by way of a measuring amplifier 53, likewise feeds a weight-proportional measuring pulse to the multiplier 51. The value of the conveying stream density calculated by the multiplier is fed over a signal line 54 to a console 56 directly and also by way of a pulse generator 55 for, on the one hand, reference/actual comparison and is compared therein to a digitally input reference value. This occurs with the assistance of the signal line 57 and a logic unit 58 which, in case of a fluctuation, connects the differential amount to a proportional-integral regulator 60 by way of a line 59. The proportional-integral regulator 60 calculates a manipulated variable and feeds a setting pulse proportional to the calculated manipulated variable to the thyristor device 50 by way of a control line 61. The thyristor device 50 corrects the speed of the motor M over a control line 62.

An integrator 63 is located in the lower portion of the control console 56, the integrator 63 indicating the overall amount conveyed in weight units at its display. The display of the digitally-set gravimetric amount to be conveyed per time unit, which represents the reference amounts, appears in the upper display field 64. The visible display of reference and actual values occurs in the left-hand, vertical scale 65. When the indicators of the scale 65 lie opposite one another without vertical deviation, the reference and actual values coincide.

The above-described device 15 for continuous, gravimetric measuring and pneumatic conveying of pourable material with the installed condition illustrated in FIG. 7, in direct, control-engineering cooperation with the filling station formed by the container 19 and a pneumatic conveyor 34, 35, 35', 44 and 25, and the control device 66 in direct metering without pre-connection of a controlled, volumetric distribution element, is an optimum solution of the object of the invention in terms of simple disposition, surveyability of the control, and minimization of the apparatus expense.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for continuous gravimetric metering and conveying of pourable material, comprising:
   first, second and third flexible couplings;
   a housing including first and second spaced walls, a charging port through said first wall connected to said first flexible coupling for connection to a supply of pourable material, a discharge port through one of said walls displaced from said charging port and at the same radius as said charging port with respect to a predetermined vertical axis, said discharge port connected to said second flexible connection for connection to a discharge line, an air port through the other wall opposite and aligned with said discharge port, said air port connected to said third flexible coupling for connection to a compressed air supply, and pivotal mounting means mounting said housing on a horizontal axis which is spaced from said predetermined vertical axis and extends through said first, second and third flexible couplings;
   a rotor mounted in and sealed to said housing for rotation about said predetermined vertical axis, including a plurality of pockets extending therethrough at spaced locations defining a circular measuring path along the same radius as said charging and discharging ports, said pockets receiving material via said charging port and emitting material through said discharge port as they orbit;
   drive means connected to rotate said rotor;
   speed indicating means connected to said drive means for indicating the speed of said rotor; and
   load measuring means connected to said housing at a point spaced from said horizontal axis and on the side of said vertical axis opposite that of said horizontal axis for measuring the weight of the material traveling along the measuring path.

2. The apparatus of claim 1, wherein:
   said drive means comprises an infinitely variable drive motor including an output shaft; and
   said speed indicating means comprises a tachometer generator connected to and driven by said output shaft.

3. The apparatus of claim 1, wherein:
   said load measuring means comprises a strain gauge.

4. The apparatus of claim 1, wherein:
   at least one of said housing walls is mounted for movement along said predetermined vertical axis; and
   further comprising bias means urging said one wall towards said rotor.

5. The apparatus of claim 4, wherein:
   said bias means comprises flange means extending from said housing spaced from said one wall; and
   spring means bearing on said flange means and said one wall.

6. The apparatus of claim 1, wherein:
   said housing further comprises an air port through said first wall, directly opposite and aligned with said discharge port, for connection to a compressed air supply.

7. The apparatus of claim 1, wherein:
   said pivotal mounting means comprises a mounting plate mounted adjacent said charging and air ports; and
   said flexible couplings are mounted to said mounting plate.

8. The apparatus of claim 1, wherein: said flexible couplings comprise tetrafluorethylene.

9. The apparatus of claim 1, wherein: said flexible couplings comprise polyurethane.

10. The apparatus of claim 1, wherein: said flexible couplings comprise rubber.

11. The apparatus of claim 1, wherein: said flexible couplings comprise natural caoutchouc.

12. The apparatus of claim 1, wherein: said flexible couplings comprise vinyl caoutchouc.

13. The apparatus of claim 1, wherein:
    said flexible couplings comprise felt.

14. The apparatus of claim 1, wherein the pourable material is granular coal, and further comprising:
    a coal supply bin directly connected to said first flexible coupling;
    kiln means including a burner and a source of combustion air connected to said burner; and
    a discharge line connected between said discharge port and said kiln means.

15. The apparatus of claim 1, and further comprising:
    sealing elements between said first and second walls, respectively, and said rotor.

16. The apparatus of claim 1 wherein:
    said horizontal axis extends through the centers of motion of said first, second and third flexible connections.

17. The apparatus of claim 1, wherein:
    said first wall is an upper wall and said second wall is a lower wall; and
    said drive means is mounted to said upper wall.

18. The apparatus of claim 1, wherein:
    said first wall is an upper wall and said second wall is a lower wall; and
    said drive means is mounted to said lower wall.

19. The apparatus of claim 1, and further comprising:
    a control system connected to said drive means and to said speed indicating means and to said load measuring means and operable to control the throughput of said apparatus.

20. The apparatus of claim 19, wherein said control means comprises:
    product means connected to said speed indicating means and to said load measuring means and operable to produce a signal indicating the product of speed and weight as material throughput;

comparison means connected to said product means and operable to compare the product signal with a reference value; and drive control means connected to said comparison means and operable to control drive speed in accordance with any deviation between the actual and reference values of material throughput.

21. The apparatus of claim 1, wherein:
said pockets are cylindrical pockets.

22. The apparatus of claim 1, wherein:
said pockets are generally rectangular pockets including arcuate inner and outer radii.

23. Apparatus for continuous gravimetric metering and conveying of pourable material, comprising:
first, second and third flexible couplings;
a housing including first and second spaced walls, a charging port through said first wall connected to said first flexible coupling for connection to a supply of pourable material, a discharge port through one of said walls displaced from said charging port and at the same radius as said charging port with respect to a predetermined vertical axis, said discharge port connected to said second flexible connection for connection to a discharge line, an air port through the other wall opposite and aligned with said discharge port, said air port connected to said third flexible coupling for connection to a compressed air supply, and pivotal mounting means mounting said housing on a horizontal axis which is spaced from said predetermined vertical axis and extends through said first, second and third flexible couplings;
a rotor mounted in and sealed to said housing for rotation about said predetermined vertical axis, including a plurality of pockets extending therethrough at spaced locations defining a circular measuring path along the same radius as said charging and discharging ports, said pockets receiving material via said charging port and emitting material through said discharge port as they orbit;
drive means connected to rotate said rotor;
speed indicating means connected to said drive means for indicating the speed of said rotor; and
load measuring means connected to said housing at a point spaced from said horizontal axis and on the side of said vertical axis opposite that of said horizontal axis for measuring the weight of the material traveling along the measuring path, and
wherein said housing is an explosion-proof housing and further comprises a third housing wall peripherally-connected to and spaced from said first wall to form a first seal chamber, a fourth housing wall peripherally connected to and spaced from said second wall to form a second seal chamber, and an incompressible liquid filling said first and second chambers.

* * * * *